May 23, 1939.  R. R. CHAPPELL ET AL  2,159,424
SHAFT SPEED INDICATOR
Filed May 9, 1936  2 Sheets-Sheet 1
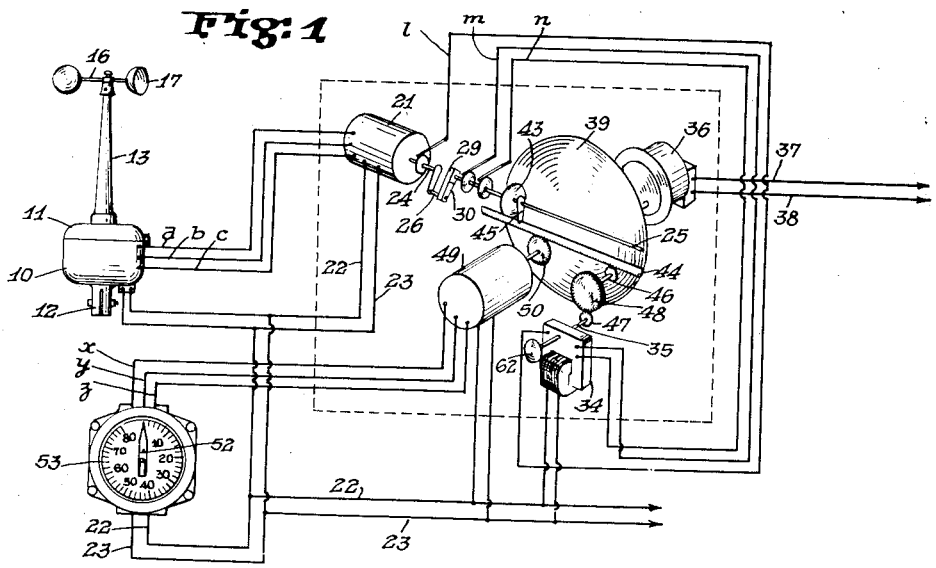
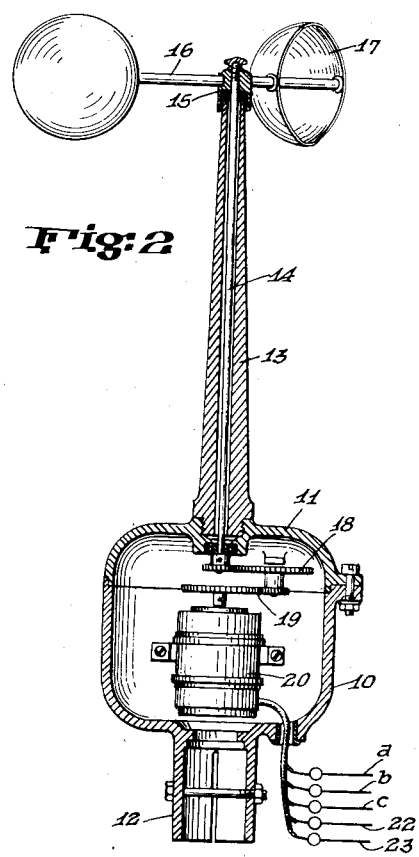
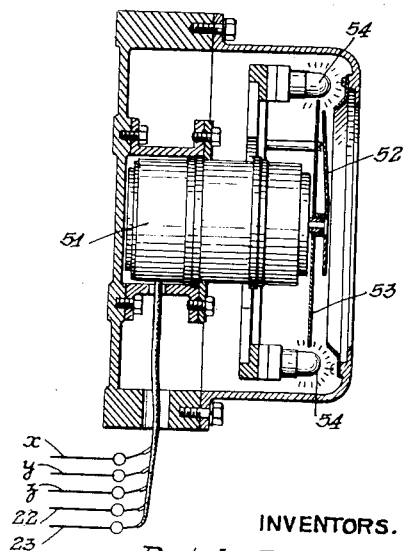
INVENTORS.
Ralph R. Chappell
Rutger B. Colt
Robert J. Streb
BY Stephen Cerstvik.
ATTORNEY.

INVENTORS.
Ralph R. Chappell
Rutger B. Colt
Robert J. Streb
BY Stephen Cerstvik
ATTORNEY.

Patented May 23, 1939

2,159,424

UNITED STATES PATENT OFFICE 2,159,424

SHAFT SPEED INDICATOR

Ralph R. Chappell, Richmond, Va., and Rutger B. Colt and Robert J. Streb, Baltimore, Md., assignors to Bendix Aviation Corporation, South Bend, Ind., a corporation of Delaware Application May 9, 1936, Serial No. 78,928

11 Claims. (Cl. 177—351)

This invention relates to precision instruments and more particularly to apparatus for measuring, transmitting and indicating the speed of a rotating part.

One of the objects of the present invention is to provide novel apparatus for determining the angular velocity of a rotating part such as, for example, the shaft of a motor or like part.

Another object of the invention is to provide novel means for transmitting a shaft speed, for example, to a plurality of remote indicators which may be calibrated to indicate the value of the variable force driving the shaft, such as wind intensity.

Still another object is to provide a novel system for transmitting indications of the speed of a comparatively inaccessible part to remotely located indicators wherein resettings, adjustments and corrections may be made at a readily accessible station, such as at an armor protected station aboard a war vessel.

A further object is to provide a novel shaft speed transmitting and indicating system which is accurate and sensitive over the entire range of speeds from very low to high speeds.

A still further object is to provide means including novel switching mechanism for causing a plurality of independently driven shafts to operate in approximate synchronism.

Another object is to provide a novel wind intensity measuring and indicating system wherein a continuous, steady indication of wind velocity is obtained, the indications being substantially free from the effects of temporary gusts.

Another object is to provide novel apparatus wherein self-synchronous motors are combined with a rotating anemometer for producing a continuous indication of wind intensity.

The above and further objects and novel features of the invention will more fully appear from the following detail description when taken in connection with the accompanying drawings. It is to be expressly understood, however, that the drawings are for the purpose of illustration only and are not designed as a definition of the limits of the invention, reference being had primarily for this purpose to the appended claims.

In the drawings, wherein like reference characters refer to like parts throughout the several views, Fig. 1 is a diagrammatic illustration of one form of the novel system comprehended by the present invention;

Fig. 2 is a side elevation, partly in section, of an anemometer and transmitting unit which may be employed in the embodiment of Fig. 1;

Fig. 3 is a side elevation, partly in section, of an indicating instrument;

Figure 4:
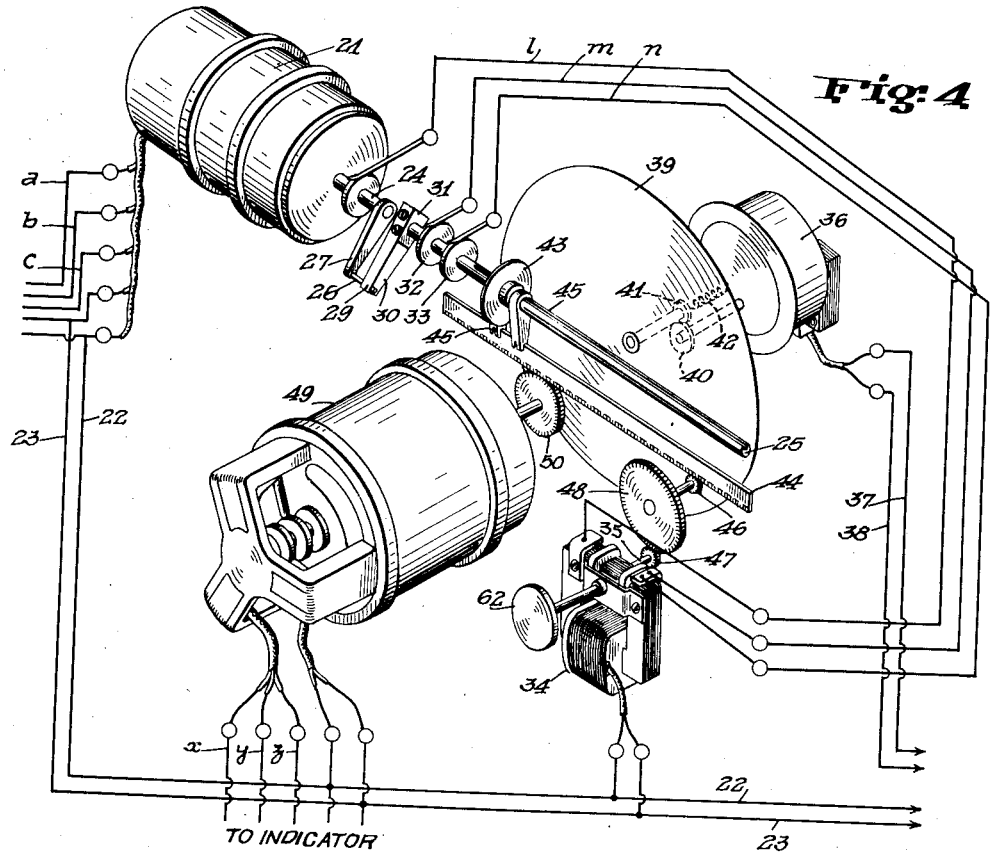
Fig. 4 is a diagrammatic isometric view of the receiving and distributing mechanism.

For the purpose of illustration, one embodiment of the invention is shown, by way of example, in the accompanying drawings, in the form of a system for measuring, transmitting and indicating the intensity of wind, but it will be readily apparent that the novel features of the invention are adapted for use in other fields and particularly for measuring the angular velocity of any rotating member. The wind velocity is measured in the illustrated embodiment by a freely rotating three-cup anemometer, and the shaft speed of the latter, which constitutes a measure of wind velocity, is electrically transmitted by self-synchronous motors to a readily accessible station. At the latter station, novel means are provided for moving an element from a reference position a distance which, in accordance with a predetermined scale, is representative of the instantaneous speed of the anemometer shaft and hence of wind velocity. An indication of the position of said element may be distributed to any number of remote indicating devices by synchronous motors or any other suitable or desirable transmission means known to the art. Said indicating devices may be calibrated in terms of wind intensity or other force employed in producing the initial shaft rotation.

Referring now to the drawings, and more particularly to Figs. 1 to 4, inclusive, the embodiment of the invention shown comprises a rotatable cup anemometer which is designed to effect rotation of a shaft at a speed proportional to the intensity of the wind acting thereon. Although the speed of the anemometer shaft may be measured directly in accordance with the method of the invention, said shaft speed is preferably transmitted to a remote station for this purpose, the transmitting means being combined with the anemometer into a neat, compact unit. The latter, in the form shown, includes a cup-shaped housing 10 provided with a cover 11 and a depending portion 12 whereby the same may be secured to a stud on the mast or yardarm of a vessel or in any other suitable place where the anemometer cups will be as free as possible from obstructions or eddy currents that would disturb the wind flow. A hollow shaft housing 13 is threadedly mounted on cover 11 and extends upwardly therefrom.

A shaft or spindle 14 is centrally and rotatably supported in housing 13 by a pair of ball bearings adjacent the upper and lower ends thereof and has a hub portion 15 secured to said upper end. A plurality of arms 16, preferably three in number, extend radially from hub 15 and support cups 17 at the outer ends thereof, said cups being designed to produce a known number of revolutions of shaft 14 per unit of time for any given velocity of the wind impinging thereon. The lower end of shaft 14 is preferably connected through a reduction gear train 18, 19 to the armature of a self-synchronous generator 20 mounted in housing 10, 11, said armature being free to rotate under no load except for the small frictional load due to bearing surfaces.

Generator 20 is electrically connected to a self-synchronous motor 21 in any well-known manner so that the armature of the latter will move in synchronism with the armature of the former and accordingly bear a predetermined ratio to the speed of anemometer shaft 14. Self synchronous motors 20 and 21 are preferably of the three-phase type wherein the three-phase winding is on the rotors and the excitation is supplied to the stators. The windings of the rotors of motors 20 and 21 are connected to each other by leads a, b and c and suitable brushes cooperating in the usual manner with collector rings on the rotor shafts. The stator excitation current is supplied to said motors, as well as to other motors to be hereinafter described, from a common source of alternating current supply 22, 23, the leads from said source bearing the same reference characters throughout the system.

Novel means are provided for converting changes in the rotational speed of armature shaft 24 of motor 21 into limited rectilinear or angular movement of an element, the position of which, relative to a reference position, will constitute a measure of the instantaneous speed of said shaft and hence of the velocity of the wind impinging on cups 17. In the form shown, said means comprise a rotatable shaft 25 and novel switching mechanism interposed between said shaft and shaft 24 for detecting relative rotation therebetween, said switch mechanism being adapted to control novel means for varying the speed of shaft 25 to cause the same to operate in approximate synchronism with shaft 24.

The switch mechanism, as shown in the embodiment of Fig. 4, includes a contact pin 26 mounted on the outer end of a radially extending crank arm 27 on said shaft 24 and is electrically connected to a collector ring 28. Pin 26 extends between a pair of spaced contacts 29 and 30 secured to an insulating block 31 mounted on one end of shaft 25 and contacts 29 and 30 are electrically connected to collector rings 32 and 33, respectively. Block 31 is preferably frictionally mounted on shaft 25 so as to avoid any damage to the switch or contact mechanism if shaft 24 is accelerated faster than shaft 25 can follow. Rings 28, 32 and 33 are connected through suitable brushes of any usual or well-known construction and leads l, m and n, respectively, to the shading coil windings of a small reversible induction motor 34 so that a closed circuit through leads l, m will cause rotation of armature shaft 35 of the motor in one direction and a closed circuit through leads l, n will cause said shaft to rotate in the reverse direction. Motor 34 is of the single phase alternating current excitation type, the stator windings being connected to main power leads 22, 23, but other types of reversing motors may be employed.

Means for driving shaft 25 at a variable speed in synchronism with the armature of motor 21 which repeats the anemometer shaft speed comprise any suitable constant speed driving means, such as a telechron motor 36 which is shown connected to a source 37, 38 of controlled frequency alternating current, but source 22, 23 may be employed if the frequency of current oscillations therein is maintained constant. Motor 36 is adapted to drive a large friction disc 39 at constant speed through a positive driving connection comprising gears 40 and 41. Disc 39 is preferably mounted to have limited axial movement along an axis which intersects shaft 25 at right angles and is resiliently held by any suitable means, such as a spring 42, in frictional driving engagement with the peripheral surface of a small disc 43 that is keyed to shaft 25 for longitudinal movement thereon. It will thus be seen that the speed of shaft 25 will vary as the position of disc 43 relative to the axis of constant speed disc 39 varies, the speed of said shaft increasing as the point of contact between the discs moves away from said axis toward the periphery of disc 39. When the point of contact is such that shafts 24 and 25 are operating at the same speed, the radial distance of said point of contact from the center of disc 39 will constitute a measure of the speed of the two shafts. That is, the shaft speeds may be determined from the known velocity of disc 39 and the known circumferences of the driving surfaces of the discs.

For the purpose of moving disc 43 along shaft 25 and radially of disc 39 to vary the angular speed of said shaft in accordance with variations in the speed of motor shaft 24, suitable shifting means operatively connected to the armature of reversing motor 34 are provided. As shown, said means comprise a rack 44 suspended from shaft 25 by means of a pair of shifter arms 45, 45 which are loosely journaled on said shaft and engage the hub of disc 43 on the opposed sides thereof. The lower toothed face of rack 44 coacts with a small pinion 46 which is adapted to be driven in either direction by armature shaft 35 of motor 34 through reduction gearing 47, 48. The position of rack 44 as well as the angular position of armature shaft 35, or that of some other shaft moved by said armature shaft at a suitable reduction ratio, will also be indicative of the instant speed of shafts 24 and 25 and hence a measure of the wind velocity acting on cups 17.

Means are provided for distributing said shaft speed measurements, as indicated by the position of rack 44, for example, to one or more remote indicators, such means preferably comprising a self-synchronous generator 49, the armature or rotor of which carries a pinion 50 that meshes with rack 44. The diameter of pinion 50 is preferably such that the angular movement thereof will be limited to an arc of about 330° during movement of disc 43 through a distance equal to the radius of disc 39. Motor or generator 49 may be connected to one or more synchronous motors 51 located in suitable indicating instruments at desirable remote or local stations, the three-phase windings of the armatures of said motors being connected by leads x, y and z and the usual brushes and collector rings. The stators of both motors are connected to the common alternating current source 22, 23 which supplies the excitation current. Secured to the armature of motor 51, which repeats the position of the armature of generator 49, is a pointer 52 that moves over a stationary scale 53, the latter being calibrated in terms of wind velocities from zero to eighty knots. Pointer 52 will thus move in synchronism with rack 44 and constantly indicate by its angular position relative to zero position the instantaneous velocity of the wind as determined by anemometer 14, 17. It will be understood, of course, that instrument 52, 53 could be calibrated to indicate the speed of any rotating part or to indicate the force causing such rotation if said force bears a known relation to the angular velocity of the rotating part.

The calibrations on dial 53 may, if desired, be treated with luminous material. The dial may also be illuminated by a plurality of suitable lamps 54 installed around the periphery thereof.

In the operation of the above system, shaft 14 is rotated by the force of the wind acting on anemometer cups 17 at a speed bearing a known proportion to the velocity or intensity of said wind. The speed of said shaft is repeated through self-synchronous motors 20, 21 at a control or distributing station. If the speed of shaft 24 of the receiving motor increases, it being assumed that said shaft rotates in a clockwise direction, pin 26 will engage contact 29, thereby completing a circuit through leads l, m and the proper windings of motor 34 to cause armature 35 to rotate in the appropriate direction to move disc 43 outwardly from the center of disc 39. When disc 43 reaches a position at which shaft 25 will be driven by constant speed disc 39, at the same speed as shaft 24, pin 26 will assume a neutral position between contacts 29 and 30 and thus de-energize motor 34. If the wind velocity and hence the speed of shaft 24 decrease, pin 26 will move into engagement with contact 30, thereby closing a circuit through leads l, n and causing armature 35 of motor 34 to rotate in the reverse direction. Disc 43 will likewise be moved along shaft 25 in the reverse direction until said shaft is again operating in synchronism with shaft 24. Any change in the position of disc 43 or rack 44 is translated through gear 50 into a corresponding angular movement of the armature of self-synchronous motor 49 and said angular movement is transmitted to one or more pointers 52 through synchronous receiving motors 51.

Figure 5:
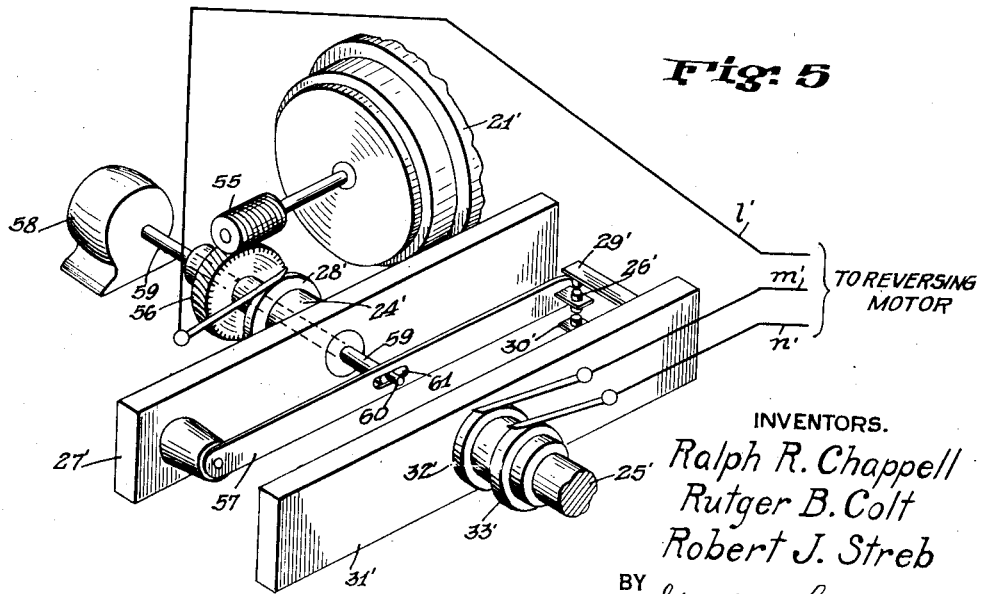
Fig. 5 is a diagrammatic illustration of a modification of the mechanism of Fig. 4.

A preferred embodiment of the switch mechanism for reversing motor 34, 35 is illustrated in Fig. 5 wherein primed reference characters are applied to parts which correspond to parts designated by like numerals in the embodiment above described. Self-synchronous motor 21', which repeats the anemometer shaft speed is adapted to drive a shaft 24' through a worm and worm gear connection 55, 56. A symmetrically disposed arm 27' is mounted on shaft 24' for rotation therewith and has a contact carrying arm 57 pivotally mounted adjacent one end thereof. A contact 26' is mounted near the free end of arm 57 and is electrically connected to collector ring 28' on shaft 24'.

An arm or block 31' similar to member 27' is mounted on the end of shaft 25' and carries a pair of contacts 29' and 30' which straddle contact 26' and are electrically connected to collector rings 32' and 33', respectively, on shaft 25'. Rings 28', 32' and 33' are connected to reversing motor 34, 35 through the usual brushes and leads l', m' and n', respectively.

Novel means are provided for alternately and periodically closing circuits l', m' and l', n' to continuously start motor 34, 35 in reverse directions in order to anticipate any relative rotation between shafts 24' and 25' and thereby facilitate the movement of disc 43 for making the appropriate correction in the speed of the latter shaft. In the form shown, said means are constituted by a continuously operating motor 58 which preferably drives a shaft 59 at constant speed. Said shaft extends through hollow shaft 24' and carries an eccentrically mounted pin 60 which projects through an elongated slot 61 in arm 57, the width of said slot being substantially equal to the diameter of said pin. Contact 26' will thus be arcuately reciprocated to alternately engage contacts 29' and 30' and accordingly alternately energize motor 34, 35 for operation in reverse directions.

In the operation, therefore, of the embodiment of Fig. 5, motor 34, 35 will be periodically energized to rotate alternately in opposite directions. If relative rotation between shafts 24' and 25' occurs, it will be seen that the engagement between contact 26' and one of the contacts 29' or 30' will be of a longer time duration than the engagement with the other of said contacts, thereby causing armature 35 to rotate further in one direction than in the other and make the appropriate correction in the position of disc 43 and hence in the speed of shaft 25'. If the rate of change of velocity of shaft 24' is great, contact 26' will remain in engagement with the appropriate contact 29' or 30' until the correction is made. When shafts 24' and 25' are rotating at equal speeds, the time duration of engagements between contact 26' and contacts 29' and 30' will be equal. It will be apparent that a change in the relative velocities of shafts 24' and 25' during the engagement of said contacts will be communicated to motor 34 without the slightest delay.

In order to minimize the movement of armature 35 during quick reversals of equal duration and to thus avoid any substantial or material oscillations of indicator hand 52, an inertia disc 62 is provided on the shaft of armature 35. Said inertia member is effective to render the total motion of armature 35 for quick reversals very small without hampering or disturbing continuous running of the motor.

There is thus provided novel shaft speed measuring and indicating means adapted for use in combination with a rotating anemometer for accurately measuring, transmitting and continuously indicating instantaneous wind velocities either at local or remote stations. The novel system provided comprehends an adaptation of self-synchronous motors to a continuously rotating anemometer whereby the indicating instrument is rendered sensitive to and adapted to accurately indicate the lowest wind velocity which is capable of starting rotation of the anemometer cups.

Although only two modifications of a single embodiment of the invention have been illustrated and described in detail, it is to be expressly understood that the same is not limited thereto but that various changes may be made. For example, pin 26 (Fig. 4) may contact both of the strips 29 and 30 during synchronous operation of shafts 24 and 25 and move out of contact with one or the other of said strips when relative rotation occurs between said shafts until the proper correction has been made by motor 34. Various other changes may also be made in the details of construction, design and arrangement of parts illustrated without departing from the spirit and scope of the invention, as will now be apparent to those skilled in the art. For a definition of the limits of the invention, reference will be had primarily to the appended claims.

What is claimed is:

1. An indicating system, comprising a rotatable member, a second rotatable member, means for driving said second member, means for connecting said driving means to said second member including a pair of relatively movable friction elements, power means for moving one of said elements relative to the other to vary the speed ratio there-between, contact elements on said members for rendering said power means responsive to the relative rotation of said members, means for relatively reciprocating said contact elements, and means movable in response to the movement of one of said friction elements to indicate the speed of rotation of said first member.

2. An indicating system, comprising a rotatable shaft, power means, a variable driving connection between said shaft and power means, and means movable in response to changes in speed of said shaft for varying the ratio of said driving connection, said means including a pair of rotatable members, one of said members being connected to said shaft and the other of said members being connected to said power means, an electrical contact on each of said members, means for periodically moving one of said contacts into engagement with the other, means movable upon engagement of said contacts, and means responsive to the extent of movement of said last named means for indicating the speed of rotation of said shaft.

3. An indicating system, comprising a first rotatable member, a second rotatable member, means for driving said second member at constant speed, and means responsive to changes in speed of said first member comprising a pair of rotatable members one of said members being connected to said first member and the other to said second member, an electrical contact on each of said members and means for periodically moving one of said contacts into engagement with and disengagement from the other contact, means to vary the speed of said second member including two rotating friction elements, and means for relatively moving said elements whereby the distance of one from the axis of the other may be varied, said relatively moving means being controlled by said speed responsive means, and indicating means responsive to said relative movement for indicating the speed of rotation of said first member.

4. An indicating system, comprising a rotatable member, a second rotatable member, means for rotating said second member, electrical contacts on one of said members, an electrical contact on the other of said member, and means driven by a separate source of power for alternatingly engaging and disengaging said contacts, said last named means comprising a rotating eccentric.

5. In apparatus of the class described, a pair of rotatable members, means for rotating said members, an electrical contact pivotally mounted on one of said members, a pair of spaced electrical contacts on the other member adapted to be engaged by said contact, and means for alternately moving said contact into engagement with the contacts of said pair, said last means being actuated by separate power means.

6. In apparatus of the class described, a pair of rotatable members, means for rotating said members, an electrical contact on each of said members, and means for periodically moving one of said contacts into engagement with the other.

7. In apparatus of the class described, a rotatable member, means for rotating the same, an arm on said member adjacent the end thereof, a second arm pivotally mounted on said first arm and intersecting the axis of rotation of said member, and means for reciprocating said second arm through a predetermined arc.

8. In apparatus of the class described, a rotatable member, means for rotating the same, an arm pivotally mounted on said rotatable member the pivot thereof being eccentrically positioned with respect to the axis of rotation of said member, and means driven by separate power means for pivotally moving said arm during rotation of said member.

9. A pair of rotatable members, and means for synchronously driving said members, including a reversible electric motor, a pair of electric contacts on one of said members, a contact pivotally mounted on the other of said members, means connecting said contacts and said motor, and means for alternately moving said contact into engagement with the contacts of said pair to alternately energize said motor for operation in reverse directions.

10. A pair of rotatable members, and means for synchronously driving said members, including a reversible electric motor, a pair of electric contacts on one of said members, a contact pivotally mounted on the other of said members, means connecting said contacts and said motor, means for alternately moving said contact into engagement with the contacts of said pair to alternately energize said motor for operation in reverse directions, and means for damping the movements of the armature of said motor.

11. In apparatus of the class described, a pair of rotatable members, means for rotating said members, means for varying the ratio of the driving connection between one of said members and the driving means therefor, a reversible motor for controlling said last-named means, contact mechanism on said members, and means for actuating said contact mechanism during rotation of said members to alternately energize said motor for operation in reverse directions said last named means being actuated by separate power means.

RALPH R. CHAPPELL.
RUTGER B. COLT.
ROBERT J. STREB.